(12) United States Patent
Takizawa

(10) Patent No.: US 6,180,041 B1
(45) Date of Patent: Jan. 30, 2001

(54) PROCESS FOR MANUFACTURING A POINTER

(75) Inventor: Tadao Takizawa, Niigata (JP)

(73) Assignees: Nippon Seiki K.K., Niigata; Malta Incorporation, Niigata-ken, both of (JP)

(*) Notice: Under 35 U.S.C. 154(b), the term of this patent shall be extended for 0 days.

(21) Appl. No.: 08/084,097

(22) Filed: Jul. 1, 1993

(30) Foreign Application Priority Data

Jul. 7, 1992 (JP) .................................................. 04-203102

(51) Int. Cl.$^7$ .................................................. B28C 70/60
(52) U.S. Cl. ........................................ 264/255; 264/297.8
(58) Field of Search ..................................... 264/250, 255, 264/259, 328.8, 297.2, 297.3, 297.8

(56) References Cited

U.S. PATENT DOCUMENTS

| 4,269,802 | * | 5/1981 | Linne | ..................................... 264/255 |
| 4,885,121 | * | 12/1989 | Patel | ..................................... 264/255 |
| 5,167,896 | * | 12/1992 | Hirota et al. | ..................... 264/255 |

FOREIGN PATENT DOCUMENTS

| 411799 | * | 2/1991 | (EP) . |
| 60-244888 | * | 4/1985 | (JP) . |
| 60-143366 | * | 9/1985 | (JP) . |

* cited by examiner

*Primary Examiner*—Angela Ortiz
(74) *Attorney, Agent, or Firm*—McDermott, Will & Emery

(57) ABSTRACT

A process of manufacturing a pointer from a resin material and a pointer weight section from a resin material mixed with a metal powder, which weight section is integrally molded with the pointer body to provide a well-balanced pointer facilitating the design and manufacture of the pointer assembly.

6 Claims, 3 Drawing Sheets

PROCESS FOR MANUFACTURING A POINTER

BACKGROUND OF THE INVENTION

1. Field of the Invention

The present invention relates to a pointer construction with a balance weight which is mounted on a rotor shaft rotating responsively to the rotation of a moving part of an indicating instrument to indicate the value of a measured quantity against scale markings on a dial and, more particularly, to the construction of the pointer having the balance weight molded integral with the pointer and a process of manufacturing the pointer.

2. Description of the Related Art

Generally, used in an indicating instrument for, indicating the value of a quantity measured are electromagnetic instruments using a voltmeter and an ammeter such as a cross coil-type instrument and a moving coil-type instrument, which adopt the rotating pointer construction in which a pointer is fixedly attached nearly at a right angle on the forward end of a connecting rotor shaft through a rotor shaft protruding from the moving part of the instrument or gears, to read the value of the measured quantity by observing the pointer against scale divisions on the dial.

In such an indicating instrument, however, the instrument is usually mounted at a specific angle so that an observer can easily read a value indicated, or the indicator surface is so set at a right angle as to facilitate a normal view to the dial face. The pointer rotating at this mounting angle is affected by the gravity in the position of rotation and indication.

This type of instrument is so constituted as to constantly make indication in a balanced position where a turning torque corresponding to an input quantity and a return spring force are balanced, or in a matching position where a magnet rotates in the direction of compound vector of the magnetic field. Pointer unbalance, therefore, will occur in relation to the center of its rotation. If the pointer is mounted off the center of gravity, the balancing position or the matching position will shift with the effect of the gravity, giving rise to the problem that no accurate rotation and indication of a measured quantity are obtainable.

Therefore, in a conventional indicating instrument, the pointer is fitted with a balance weight in order that the pointer's center of gravity will be positioned at the center of rotation, or that the position of overall center of gravity of the moving part of the instrument and the pointer will be at the center of rotation.

For example, there have been proposed the use of a metal weight which is fixedly mounted in a pointer cap for adjusting the weight unbalance in an extended indicating portion of the pointer as disclosed in the Examined Japanese Utility Model Publication No. HEI 2-49,592, the use of a mass adjusting member such as a screw and a metal plate on the pointer as disclosed in the Japanese Patent Laid-Open No. HEI 2-272,321, and the mixture of a non-magnetic metal powder with a thermoplastic synthetic resin for molding a fine-adjusting balance weight for the balance adjustment of the moving part of the indicating instrument as disclosed in the Examined Japanese Utility Model Laid-Open No. SHO 60-143,366.

According to the conventional process described above, however, it is necessary to install an independent balance weight member separately from the pointer body in the assembly process after completion of the pointer. This process will increase an assembling manhour; furthermore, since the balance weight member is installed and fixed to the pointer by welding, press fitting or other, the pointer mounting position becomes likely to vary, resulting in a failure in accurately balancing the pointer after completion of assembly.

Also in the case of using an adjusting screw or other for mass adjustment after the installation of the balance weight, it is necessitated to perform such a troublesome adjusting operation as increasing or decreasing the mass while observing the indication of the pointer. This operation takes time to complete the pointer.

Furthermore, the pointer balance adjusting weight provided in the moving part of the indicating instrument which is made of a mixture of a synthetic resin and a non-metal powder enables fine adjustment of the weight of the balance weight itself. The mounting of the pointer to the moving part also becomes a troublesome work.

SUMMARY OF THE INVENTION

It is an object of the present invention to provide a pointer construction which is capable of minimizing balance variations of the pointer caused by improper installation of parts, and a process of manufacturing the pointer that, in a pointer body manufacturing process, a resin material mixed with a metal powder is molded integral with the balance weight section of the pointer to thereby make it unnecessary to install and fix, in the assembly process, the balance weight prepared separately from the pointer body.

According to the pointer construction of the present invention, the pointer is produced of the resin material. To the balance weight section of this pointer is added a weight of the resin material mixed with a metal powder. The weight section is molded integral with the pointer. Furthermore as a process of manufacturing the pointer by the use of a molding tool, the pointer is integrally molded, in the course of pointer molding, of the mixture of the resin material and the metal powder.

The pointer is composed of an indicating section and a pointer cap which covers the base section of the indicating section. Molded integral with this pointer cap is the weight section produced of a mixture of the resin material and the metal powder. The pointer cap having this weight section and the indicating section make up the pointer.

According to the pointer construction and the process of manufacturing the pointer of the present invention described above, the pointer balance weight can be built in the pointer, integral with the pointer, in the pointer molding process, and the pointer balance can be adjusted by adjusting the mixing ratio, or the quantity, of the metal powder mixed to the resin material corresponding to the weight section, in accordance with the shape of the pointer and overall balance of both the pointer and the moving part of the instrument to which the pointer is finally installed. When the entire part of the pointer is formed of the mixture of the resin material and the metal powder, a portion having the weight function can be designed with its size and volume adjusted so that the pointer may be balanced.

DETAILED DESCRIPTION OF THE PREFERRED EMBODIMENTS

Figure 1:
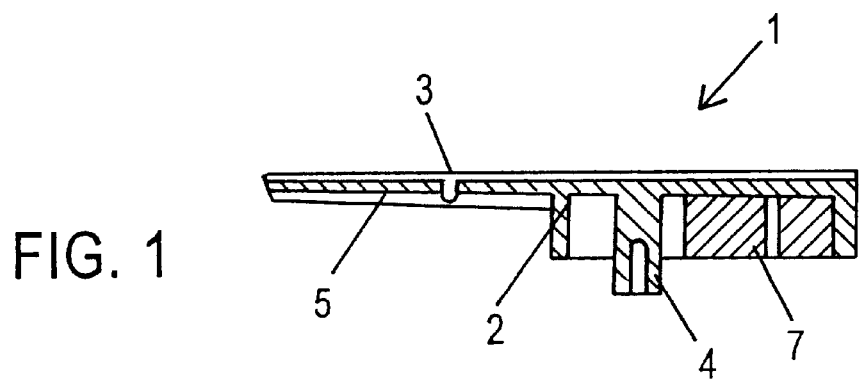
FIG. 1 is a sectional view showing one embodiment of a pointer construction according to the present invention.
Figure 2:
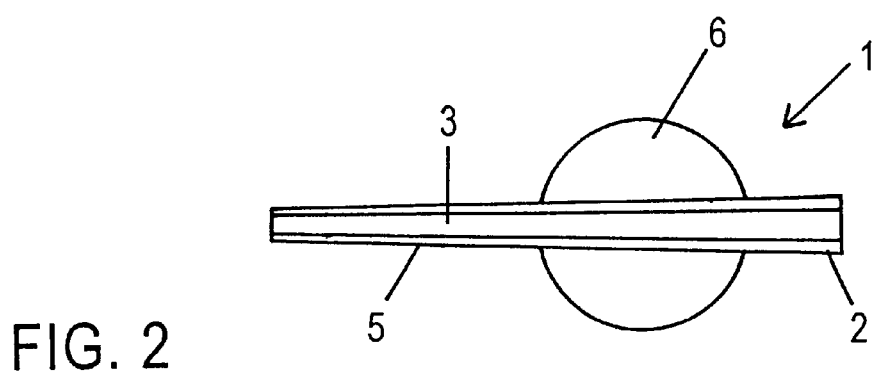
FIG. 2 is a top plan view of the pointer in the embodiment of FIG. 1.
Figure 3:
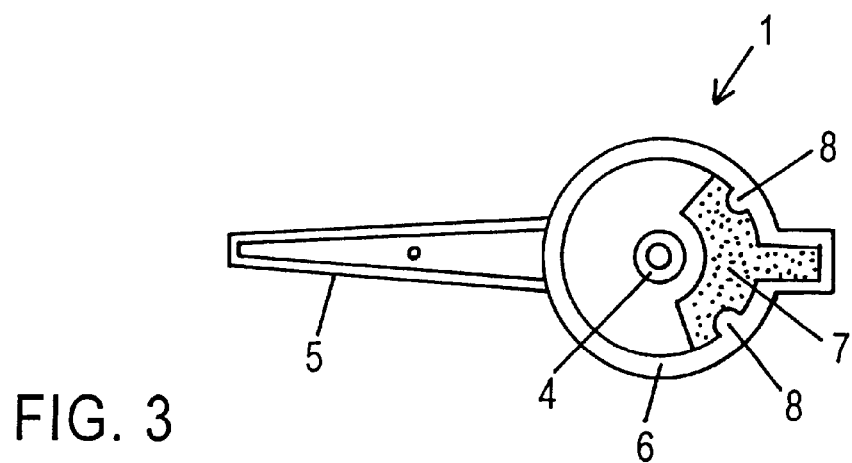
FIG. 3 is a bottom plan view of the pointer in the embodiment of FIG. 1.

FIGS. 1 to 3 show a first embodiment of a pointer construction according to the present invention, in which a pointer 1 having a white indicating line member 3 on the upper surface of a black pointer body 2 produced of a synthetic resin material, for example polycarbonate, is formed integral with a bearing seat 4 which has a press fitting hole for installing the pointer onto a rotor shaft projecting out from an instrument body not illustrated. The pointer 1 is composed of an indicating section 5 which indicates scale divisions on a dial of the instrument and a base 6 which corresponds to a cap of the pointer 1.

Inside the base 6 of the pointer 1 is formed a weight section 7 by molding as one body (in multiple colors) on the opposite side, for the purpose of balancing the indicating section 5 in relation to the bearing seat 4 positioned at the center of rotation of the pointer 1. This weight section 7 is made heavy of a mixture of a resin material, e.g. polypropyrene, and a metal, e.g. a lead powder, and is integrally secured by a guide 8 such that the weight section 7 will not fall.

The above-mentioned weight section 7 is obtainable by molding polypropyrene melted by heating and pelletized and added with a fine lead powder. The quantity of the lead powder to be mixed (content), however, is adjusted so that the center of gravity of the whole pointer 1 will be positioned at the center of rotation.

The mixing quantity of the lead powder, being adjusted by adjusting the center of gravity for balancing the pointer 1, can easily be set in accordance with the mounting position, size and shape of the weight section 7 in relation to the pointer 1.

Figure 4:
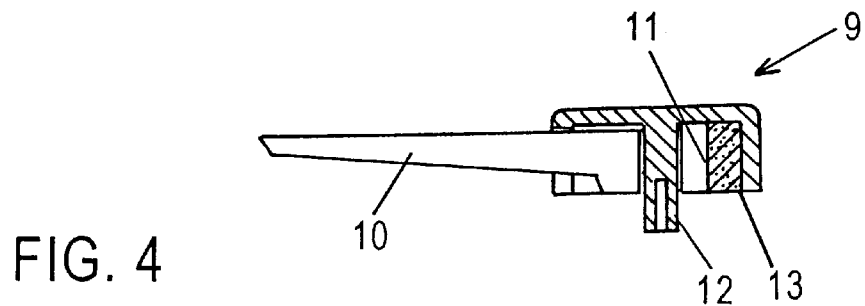
FIG. 4 is a sectional view showing a second embodiment of the pointer construction according to the present invention.

FIG. 4 is a sectional view showing a second embodiment of the pointer according to the present invention. In the first embodiment described above, the pointer is molded of the same kind of resin as the indicating section 5 inclusive of the base 6 which corresponds to the pointer cap. In the case of the present embodiment, there is shown a construction for obtaining a light-emitting pointer.

The pointer 9 has an indicating section 10 consisting of a translucent transparent resin material such as acrylic resin; this indicating section 10 receives at the base end an illuminating light from the instrument body side not illustrated, then leading the light along the reflective surface to the pointer tip side, where the light-is emitted.

Furthermore, the base end of this indicating section 10 is covered with an opaque pointer cap 11. This pointer cap 11 has a bearing seat 12 formed hanging downward to be pressed onto the rotor shaft projecting from the instrument body. The indicating section 10 is designed to be inserted for positioning through this bearing seat 12.

In the rear part of the pointer cap 11 is a weight section 13 formed as one body by molding (multiple colors). The weight section 13, like that in the first embodiment, is produced of a resin material mixed with a metal powder; the size and mixing quantity of the metal powder are adjusted for balancing weight between the indicating section 10 and the pointer cap 11.

The indicating section 10 in the present embodiment may be formed as an independent part separately from the pointer cap 11 with the weight section 13 formed as one body by molding, and be installed at the time of assembling. Also as in the first embodiment, the indicating section 10 may be molded in one piece by the molding process like the pointer cap 11.

In this case, the indicating section 10, being determined in shape to some degree from its relation of light-guiding efficiency, is sufficient if molded in a one-body (multiple colors) construction to a shape suitable to the indicating section 10 on the pointer cap 11 side.

Figure 5:
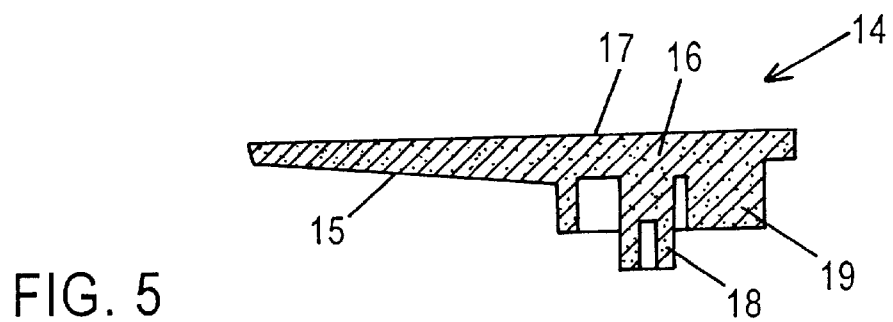
FIG. 5 is a sectional view showing a third embodiment of the pointer construction according to the present invention.

FIG. 5 shows a third embodiment of the pointer construction according to the present invention. In the first and second embodiments described above, only the weight section 7, 13 is molded of a mixture of the resin material and the metal powder, integral (multiple colors) with the pointer body in a specific shape and size, while in the third embodiment, the whole body of the pointer is formed of a mixture of the resin material and the metal powder, and a weight is addedly formed in a part which corresponds to the weight section for balancing between the indicating section and the weight section.

That is, the whole body of the pointer 14 is formed of the same material including the resin material mixed with the metal powder.

This pointer 14 has an indicating section 15 and a base section 16, which make up a pointer body 17. In this case, however, the pointer 14 is formed with the size of the weight section 19 adjusted to balance the weight moment of the bearing seat 18 portion ranging from the center of rotation to the rear side against the weight moment of the indicating section 15 side.

The adoption of the above-described pointer construction makes it unnecessary to mold the weight section 19 in a separate shape, but can be molded into a single part construction in a single molding cycle. Particularly, increasing the weight of the whole body of the pointer 14 will facilitate fine adjustment of the balance.

Also, to decrease the weight of the pointer, the use of different mixing ratios of metal powder between the tip side and the rear side of the pointer 14, that is, the use of a larger quantity of the metal powder in the weight section 19 side in relation to the center of rotation will be sufficient. Especially in the case of a long indicating section 15, the pointer can be balanced without unnecessarily increasing the size of the weight section 19.

Gates are provided at two places in the pointer tip side and the rear side for feeding the resin-metal powder mixture into the mold. Through these two gates are injected a resin paste mixed with the metal powder at different mixing ratios, thereby molding a pointer in a single-unit type construction.

Next, the process of manufacturing the pointer according to the present invention will be explained.

Figure 6:
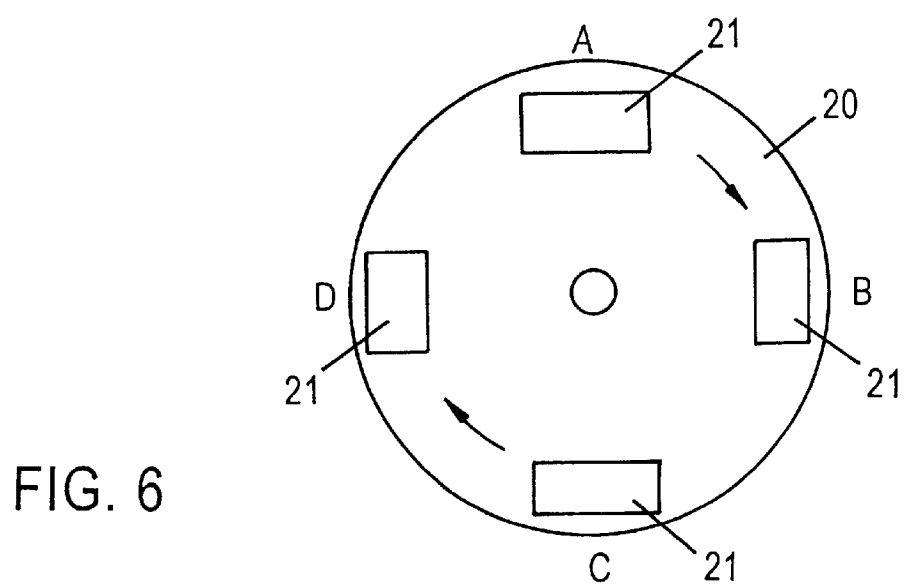
FIG. 6 is a plan view of a major portion of a rotary table-type molding equipment for effecting a process of manufacturing the pointer of the present invention.

FIG. 6 is a plan view showing an embodiment of a major portion of a pointer manufacturing apparatus to be used for performing the typical process of molding the pointer of the present invention.

In FIG. 6, a rotary table 20 rotates intermittently at the rotation cycles of from A to D, forming the pointer by the A to D processes.

In four places of the rotary table 20 are set cores 21 as lower molds, and injection molding is done by the cavity as an upper die in regular sequence in each of the A, B and C processes. In the D process the pointer 1 is completed and taken out.

In each of the A, B and C processes, the resin material molten by a hopper not illustrated is injected into the mold through a runner, molded and cooled down in each process, and then transferred to the following process by the rotation of the rotary table 20.

Figure 7:
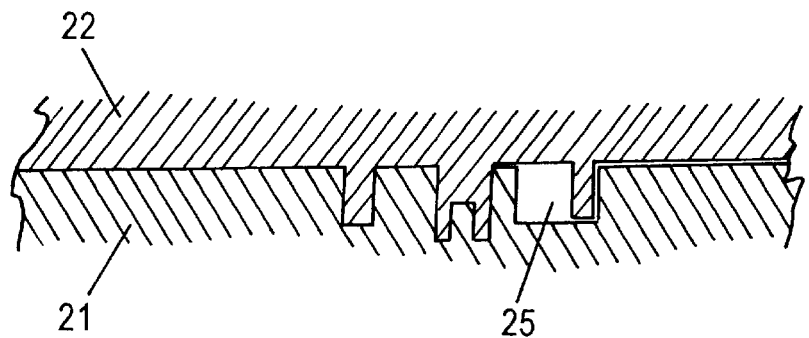
FIG. 7 is a sectional view of a major portion of a molding tool in a first process showing one embodiment of a pointer manufacturing process according to the present invention.
Figure 8:
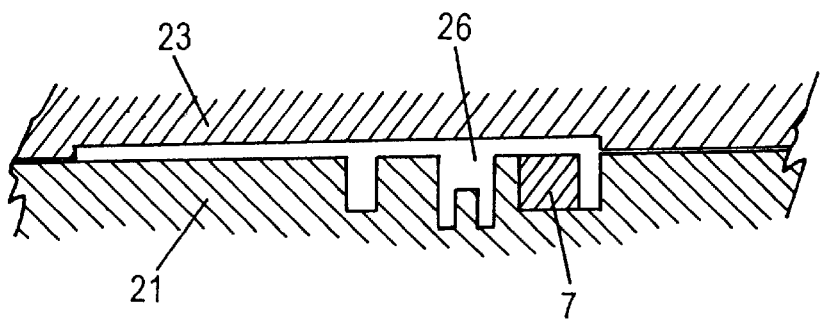
FIG. 8 is a sectional view of a major portion of a molding tool in a second process showing one embodiment of the pointer manufacturing process according to the present invention.
Figure 9:
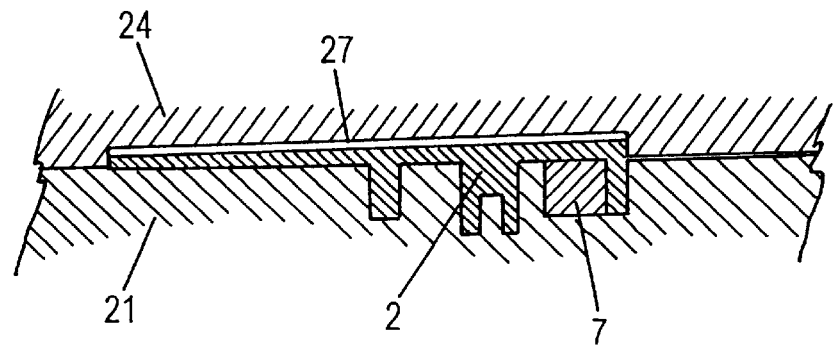
FIG. 9 is a sectional view of a major portion of a molding tool in a third process showing one embodiment of the pointer manufacturing process according to the present invention.

FIGS. 7 to 9 are sectional views of molds explaining a molding condition in each of the A to C processes.

First, in the A process, an injection molding cavity 25 defined by the core 21 and a cavity 22 has a shape suitable for molding the weight section 7 of the pointer shown in FIG. 1. That is, the cavity 22 registered to the core 21 on the rotary table 20 has a shape as shown in FIG. 7; into the molding space 25 is injected a molten resin material (polypropyrene) mixed with a metal (lead) powder through a gate not illustrated, thus molding the weight section 7.

After the cooling of the molded weight section 7, the rotary table 20 turns to transfer the molding to the B process, where the weight section 7 thus molded and set remains in the core 21 as shown in FIG. 8 and the cavity 23 formed to a shape suitable for molding the pointer body 2 is aligned to the core 21.

As shown in FIG. 8, the injection molding space 26 defined by the core 21 and the cavity 23 has the shape of the pointer body 2 for integrally molding the weight section 7. The black molten polycarbonate resin material is injected through the gate not illustrated.

The pointer body 2 having the weight section 7 molded integral (multiple colors) with the pointer 1 is thence formed in the B process, and subsequently turned and transferred, after being cooled for setting, to the following C process. In the B process the pointer body 2 is being formed, while in the A process the similar molding of the weight section 7 is performed; a like molding operation is done in the following process where the four cores 21 on the rotary table 20 are transferred in succession from the A process to the D process.

In the following C process, the indicating line member 3 on the pointer 1 shown in FIG. 1 is formed. At the core 21 in the C process both the weight section 7 and the pointer body 2 fed in as a single piece as shown in FIG. 9 are present. The injection molding space 27 between the core 21 and the cavity 24 is so defined as to have the shape of the indicating line member 3 to be molded on the upper surface of the pointer body 2.

Into this injection molding space 27 is injected a white molten resin material through the gate, thus molding the indicating line member 3 integral with the pointer body 2. In this case, the indicating line member 3 can be cast-molded much firmer by providing a through hole in the pointer body 2, into which the resin material of the indicating line member 3 is cast for molding.

The pointer 1 thus molded is transferred to the D process by the rotation of the rotary table 20 and then is taken out of the core 21, thus completing the manufacturing process.

The pointer 1 shown in FIG. 1 is completed as described above, but since the weight section 7 produced of the resin material mixed with the metal powder is molded integral with the pointer 1 in the pointer molding process, the weight moment of the pointer 1 can be calculated out provided that the material and shape of each member is designed in advance. Therefore it is possible to obtain the pointer 1 well balanced with its center of gravity positioned at the center of rotation by properly calculating and setting the weight of the balance weight section 7, i.e., the content of the metal powder to be mixed, for balancing the pointer 1, thereby unnecessitating the installation of a separate metal weight to a resin pointer that is required in a prior art and accordingly improving productivity.

The manufacturing process described above is for molding the pointer 1 shown in FIGS. 1 to 3. The pointers 9 and 14 shown in FIGS. 4 and 5 can also be produced in a basically similar molding process. In the initial design of pointer shape and material, when the weight moment is calculated out to provide a weight section properly shaped for use in the pointer, the pointer molded integral with the weight section having a mixed quantity of metal powder determined can be produced, thereby enabling stabilized mass production of the pointer.

According to the pointer construction of the present invention heretofore described, the quantity of the metal powder to be mixed to the resin material is adjusted for proper formation of the balance weight section to thereby adjust the weight moment with respect to the center of rotation of the pointer body and the weight section balanced at weight determined in the initial design of the pointer. Thence the weight section can be formed integral with the pointer in the pointer body molding process, thereby enabling unnecessitating such a troublesome operation as the mounting of a separately manufactured metal weight in the conventional pointer assembly process.

Furthermore, since the weight section can be formed integral with the pointer in the pointer molding process, there occurs no variation in pointer balance resulting from incorrect installation of a separate weight to a pointer of a conventional pointer construction; therefore once the design of the pointer balance is determined, stabilized pointer production can be accomplished simply by adjusting molding accuracy.

Furthermore, since indication characteristics can be stabilized not only by adjusting the balance of the pointer alone but also by adjusting the overall balance of the pointer assembly secured on the moving part of the instrument even when there exists a factor of unbalance of a fixed tendency in the moving part of the instrument, it becomes possible to design the adjustment of the quantity of metal powder to be mixed to the weight section of the pointer on the presupposition of the unbalance of the fixed tendency. It, therefore, is possible to provide the pointer construction and the process of manufacturing a very superior pointer which is capable of providing the indicating instrument as a whole with effective indication characteristics.

While a preferred embodiment of the present invention are shown and described hereinabove, it will be understood that this invention is not to be limited thereto, since many modifications and changes may be made therein, and it is contemplated therefore, by the appended claims, to cover any such modifications as fall within the true spirit and scope of the present invention.

What is claimed is:

1. A process of manufacturing a pointer by molding a resin in a mold comprising an upper die having a plurality of cavities and a lower core die, comprising forming a first molding space with said core die and a first cavity corresponding to a weight section of said pointer, injecting a mixture of resin material and metal powder into said first molding space, forming a second molding space with said core containing said weight section and a second cavity, and injecting the resin material into the second molding space corresponding to an indicating section of said pointer thereby integrally molding said weight section and said indicating section of said pointer.

2. A process of manufacturing a pointer comprising an indicating section, a pointer cap covering a base of said indicating section and a weight section by molding a resin in a mold comprising an upper die having a plurality of cavities and a lower core die, comprising forming a first molding space with said core and a first cavity corresponding to the weight section, injecting a mixture of resin material and metal powder into said first molding space, forming a second molding space with said die containing said weight section and a second cavity, injecting the resin material into the second molding space corresponding to said pointer cap and fixedly attaching said indicating section to said pointer cap obtained through said molding process.

3. A process of manufacturing a pointer by integrally molding a weight section of a mixture of resin material and metal powder and a pointer body section of a resin material comprising forming a first molding space with an upper die having a plurality of cavities using a first cavity and a lower core die corresponding to either said pointer body section or said weight section, injecting and cooling a resin material for said pointer body section or a mixture of resin material and metal powder for said weight section into said first molding space, forming a second molding space with a second cavity and core die corresponding to the said pointer body section or said weight section not molded in said first molding space with a second cavity and core die, and injecting and cooling the resin material or the mixture of resin material and metal powder into said second molding space.

4. The process according to claim 1, wherein said core die comprises a plurality of rotatable cores.

5. The process according to claim 2, wherein said core die comprises a plurality of rotatable cores.

6. The process according to claim 3, wherein said core die comprises a plurality of rotatable cores.

* * * * *